United States Patent
Kalan et al.

(10) Patent No.: US 10,411,902 B2
(45) Date of Patent: Sep. 10, 2019

(54) AUTHENTICATING A SYSTEM BASED ON A CERTIFICATE

(71) Applicant: ZixCorp Systems, Inc., Dallas, TX (US)

(72) Inventors: John Kalan, Dallas, TX (US); Charles A. Rego, Dallas, TX (US); Deryk Shane Agnew, Plano, TX (US); David Joseph Robertson, Richardson, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 230 days.

(21) Appl. No.: 15/377,445

(22) Filed: Dec. 13, 2016

(65) Prior Publication Data

US 2018/0167221 A1 Jun. 14, 2018

(51) Int. Cl.
| | |
|---|---|
| H04L 29/06 | (2006.01) |
| H04L 9/32 | (2006.01) |
| H04L 9/30 | (2006.01) |
| G06F 21/31 | (2013.01) |
| H04W 12/06 | (2009.01) |
| H04L 29/12 | (2006.01) |

(52) U.S. Cl.
CPC ........... *H04L 9/3263* (2013.01); *G06F 21/31* (2013.01); *H04L 9/30* (2013.01); *H04L 9/3247* (2013.01); *H04L 63/0428* (2013.01); *H04L 63/08* (2013.01); *H04L 63/126* (2013.01); *H04W 12/06* (2013.01); *H04L 61/1511* (2013.01); *H04L 63/0823* (2013.01)

(58) Field of Classification Search
CPC ....... H04L 9/30; H04L 9/3263; H04L 9/3268; H04L 9/3247; H04L 63/0428; H04L 63/08; H04L 63/126; H04L 61/1511; H04L 63/0823; H04W 12/06; G06F 21/31
See application file for complete search history.

(56) References Cited

U.S. PATENT DOCUMENTS

| | | |
|---|---|---|
| 8,886,747 B1 | 11/2014 | Chen et al. |
| 9,363,088 B2 | 6/2016 | Kalan |
| 2002/0080975 A1* | 6/2002 | Rich ............... H04L 9/3263 380/286 |
| 2005/0246771 A1* | 11/2005 | Hunt ............... H04L 9/3273 726/18 |
| 2008/0276318 A1 | 11/2008 | Leung et al. |

(Continued)

OTHER PUBLICATIONS

EPO "Communication" for Application No. 17204821.7-1218; 9 pages.

*Primary Examiner* — Yogesh Paliwal
(74) *Attorney, Agent, or Firm* — Baker Botts L.L.P.

(57) ABSTRACT

According to certain embodiments, a method receives a certificate that identifies a sender system as owning a domain. The method sends an electronic message to the domain identified in the certificate. The electronic message is sent via a mail exchange network that correlates the domain to an address that a true owner of the domain has registered with a mail exchange authority. The method receives a response from the address that the mail exchange network correlates to the domain. The response indicates that the certificate is associated with the true owner of the domain. The method authenticates the sender system as the true owner of the domain based on the response.

24 Claims, 8 Drawing Sheets

(56) References Cited

U.S. PATENT DOCUMENTS

| | | | | |
|---|---|---|---|---|
| 2010/0144275 A1* | 6/2010 | Satou | ............... | H04W 12/06 |
| | | | | 455/41.2 |
| 2011/0055911 A1* | 3/2011 | Adelman | ............ | G06Q 10/107 |
| | | | | 726/7 |
| 2012/0036364 A1* | 2/2012 | Yoneda | ............... | H04L 9/30 |
| | | | | 713/175 |

* cited by examiner

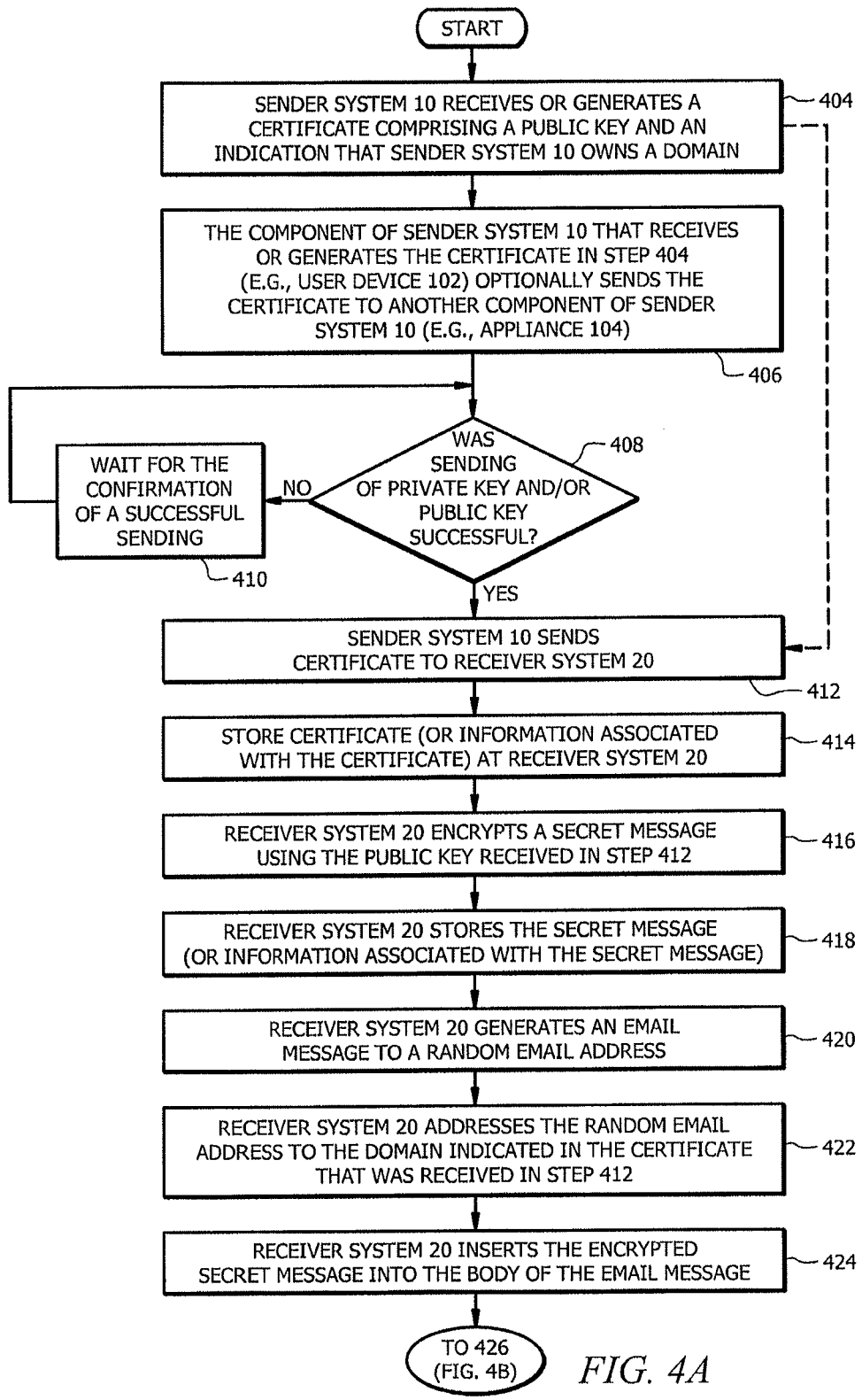

AUTHENTICATING A SYSTEM BASED ON A CERTIFICATE

TECHNICAL FIELD

Certain embodiments of the present disclosure relate, in general, to computer security, and more particularly, to authenticating a system based on a certificate.

BACKGROUND

In cryptography or computer security, a certificate is an electronic document used to prove the existence of a relationship. As an example, a certificate may be used to prove that a relationship exists between a public key and an email address associated with the owner of the public key. The certificate includes information about the key, information about the entity that owns the key, and the digital signature of an entity that has verified the accuracy of the certificate's contents. If the digital signature is valid and the signer is trusted, then the key can be used to communicate with its owner. Typically, the entity providing the digital signature is a certificate authority, such as a trusted third party company that charges customers to issue certificates. However, in certain cases, the certificate is not signed by a trusted certificate authority. For example, the certificate may be self-signed, which means the entity providing the digital signature is the same as the entity that the certificate identifies as the owner of the key. As another example, the certificate may be signed by a certificate authority that is unknown or otherwise untrusted. A certificate can present security risks, particularly if it is not verified by a trusted certificate authority.

SUMMARY

According to certain embodiments, a method receives a certificate that identifies a sender system as owning a domain. The method sends an electronic message to the domain identified in the certificate. The electronic message is sent via a mail exchange network that correlates the domain to an address that a true owner of the domain has registered with a mail exchange authority. The method receives a response from the address that the mail exchange network correlates to the domain. The response indicates that the certificate is associated with the true owner of the domain. The method authenticates the sender system as the true owner of the domain based on the response.

According to certain embodiments, the certificate comprises a self-signed certificate signed by the sender system. As an example, the method receives a self-signed certificate from a sender system. The self-signed certificate is signed by the sender system and identifies the sender system as owning a domain. The method sends an electronic message to the domain identified in the self-signed certificate. The electronic message is sent via a mail exchange network that correlates the domain to an address that a true owner of the domain has registered with a mail exchange authority. The method receives a response from the address that the mail exchange network correlates to the domain. The response indicates that the self-signed certificate originated from the true owner of the domain. The method authenticates the sender system as the true owner of the domain based on the response. The authenticating is performed independently of a certificate authority.

In certain alternative embodiments, the certificate is signed by a certificate authority. The authenticating is performed independently of the certificate authority in the sense that, because the authenticating is based on the response received via the mail exchange network, the receiver system can authenticate the sender system without requiring the receiver system to trust the certificate authority.

According to certain embodiments, the certificate includes a public key, the electronic message to the domain identified in the certificate contains a secret message encrypted using the public key, the response from the address that the mail exchange network correlates to the domain contains the secret message as decrypted by the domain, and authenticating the sender system as the true owner of the domain comprises verifying the decrypted secret message. The certificate may also indicate a time period during which the certificate is valid.

According to certain embodiments, after authenticating the sender system as the true owner of the domain, the method receives a request to authenticate a different sender system as the true owner of the domain. The method denies the request to authenticate the different sender system as the true owner of the domain based on having already authenticated the original sender system as the true owner of the domain.

Also disclosed is a receiver system comprising at least one processor and at least one storage device. The at least one processor, in conjunction with the at least one storage device, is configured to cause the receiver system to: receive a certificate that identifies a sender system as owning a domain. The receiver system sends, via a mail exchange network, an electronic message to the domain identified in the certificate. The mail exchange network correlates the domain to an address that a true owner of the domain has registered with a mail exchange authority. The receiver system receives a response from the address that the mail exchange network correlates to the domain. The response indicates that the certificate is associated with the true owner of the domain. The receiver system authenticates the sender system as the true owner of the domain based on the response.

Also disclosed is a non-transitory computer readable medium comprising logic that, when executed by one or more processors, is operable to: receive a certificate that identifies a sender system as owning a domain. The logic is operable to send, via a mail exchange network, an electronic message to the domain identified in the certificate. The mail exchange network correlates the domain to an address that a true owner of the domain has registered with a mail exchange authority. The logic is operable to receive a response from the address that the mail exchange network correlates to the domain. The response indicates that the certificate originated from the true owner of the domain. The logic is operable to authenticate the sender system as the true owner of the domain based on the response.

Certain embodiments of the present disclosure may provide one or more technical advantages. A technical advantage of certain embodiments allows for validating, independently of a certificate authority, that a certificate is trusted. For example, certain embodiments receive a certificate that identifies a sender system as owning a domain. In certain embodiments, the certificate may be self-signed by the sender system (rather than a certificate authority) or may be signed by a certificate authority with whom the receiver system does not have a trust relationship. Thus, the signature in the certificate may be insufficient to validate the certificate. The receiver system can communicate with an address that a true owner of the domain has registered with a mail exchange authority in order to validate that the certificate is trusted and to authenticate the sender system as the true owner of the domain. Once the certificate has been validated, a technical advantage of certain embodiments allows for using the certificate for any suitable purpose, such as securing web communications, securing email communications, provisioning a system or component of a system, including the sender system in a library of signing authorities, distributing the certificate to downstream systems, treating the certificate as a root certificate in a chain of trust, and/or other suitable purpose (including any customary use of a trusted certificate). Certain embodiments may include all, some, or none of these technical advantages. Other advantages will be apparent to a person of ordinary skill in the art.

BRIEF DESCRIPTION

FIGS. 4A-4B illustrate an example of a method for authenticating a sender system, in accordance with certain embodiments.

DETAILED DESCRIPTION

Figure 1:
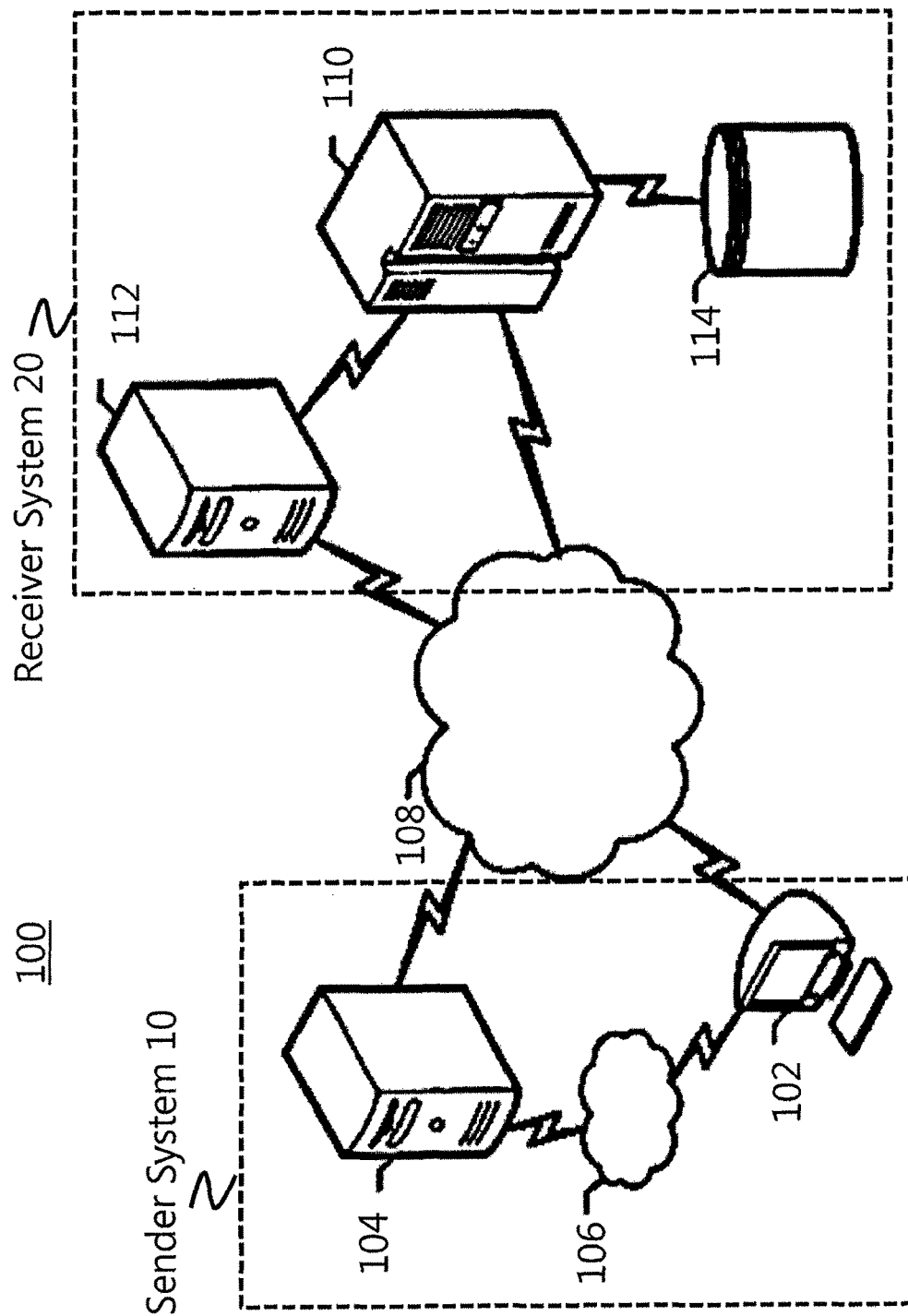
FIG. 1 illustrates an example of a system operable to authenticate a certificate, in accordance with certain embodiments.

In computer security, a receiver system may receive a certificate that identifies a sender system as owning a domain. The sender system may be unknown to the receiver system, so the receiver system must determine whether the sender system is trusted. Determining whether the sender system is trusted includes verifying that the sender system owns the domain that it claims to own and, thus, that the sender system is who it says it is. In certain embodiments, rather than having to use a trusted certificate authority to establish trust, a self-signed certificate (which does not include a signature from a certificate authority) or a certificate signed by an untrusted certificate authority can be used to establish trust. For example, trust for a certificate can be established using a mail exchange network. In certain embodiments, Domain Name System (DNS) Mail Exchange (MX) records of the mail exchange network are used to verify that the sender system actually owns the domain that the sender system claims to own according to the certificate.

In general, a mail exchange network facilitates communicating email. As an example, a mail server could access the Internet to send an email addressed to abc@zix.com through the mail exchange network. The mail exchange network routes the email to an Internet Protocol (IP) address that the owner of the domain zix.com has previously registered with a mail exchange authority. The mail exchange authority may refer to a recognized authority with which a domain owner can register an IP address for its domain. As an example, Zix Corporation can register an IP address XXX.XXX.XXX.XXX to be associated with its domain zix.com. The relationship between the domain and the IP address may be maintained in an MX record of the mail exchange authority. In certain embodiments, the mail exchange authority maintains many MX records associating various addresses to their respective domains.

As discussed above, certain embodiments of the present disclosure use the mail exchange network to establish whether a certificate is trusted. For example, in response to receiving a certificate from a sender system, a receiver system may use the mail exchange network to send an email to the domain indicated in the certificate. The mail exchange network sends the email to the address that has been registered to the domain in an MX record. Thus, the true owner of the domain receives an email from the receiver system and sends a response to the sender system. The response indicates whether the certificate that triggered the email actually came from the true owner of the domain. If yes, the receiver system may authenticate the sender system as the true owner of the domain and may recognize the certificate as trusted. Thus, the certificate can be verified using an MX record as an anchor for trust without having to trust the certificate alone. Providing an anchor for trust distinct from the certificate alone may be particularly advantageous for self-signed certificates or certificates signed by an untrusted certificate authority. That is, because such certificates can be signed by an unknown entity (rather than a reputable/trusted certificate authority), the self-signed certificate on its own may be insufficient to establish trust.

Example embodiments will be described more fully hereinafter with reference to the accompanying drawings, in which some, but not all embodiments of the inventions are shown. Indeed, these inventions may be embodied in many different forms and should not be construed as limited to the embodiments set forth herein. Like numbers refer to like elements throughout.

Many electronic messages are transmitted using public or otherwise unsecured network devices. As referenced herein, "electronic messages" include, for example, email messages, short message service ("SMS") messages, voice over internet protocol ("VoIP") messages, FaceTime® messages (which includes messages sent compliant with a plurality of protocols and standards, such as the H.264 standard, the advanced audio coding ("AAC") standard, session initiation protocol ("SIP"), real-time transport protocol ("RTP"), secure RTP ("SRTP"), among others), instant messaging ("IM") messages, mobile instant messaging ("MIM") messages, and/or any other form of electronic messages. Because electronic messages are often transmitted using unsecured network devices, the contents of unencrypted electronic messages are at risk of being compromised by interlopers while traveling between a sending device and a destination device. While many of the principles discussed herein may be applied to various types of electronic messages, many of the examples discussed herein relate to securing one type of electronic message, namely email messages, by authenticating one or more sender systems that facilitate the delivery of email messages for one or more particular email domains. The authentication process can occur before provisioning each sender system to perform one or more types of electronic security services for a particular email domain.

In accordance with some embodiments, FIG. 1 shows system 100, which includes sender system 10 and receiver system 20 communicatively coupled using network 108. Sender system 10 and receiver system 20 may each comprise any one or more components (or devices) suitable to perform the described functionality. In general, sender system 10 may be operable to send a certificate to receiver system 20 via network 108. The certificate identifies sender system 10 as owning a domain. Receiver system 20 may be operable to receive the certificate that identifies sender system 10 as owning the domain and to use a mail exchange network in order to authenticate whether the sender system is the true owner of the domain. Receiver system 10 sends an electronic message to the domain identified in the certificate via the mail exchange network. In certain embodiments, network 108 may comprise the mail exchange network. The mail exchange network correlates the domain to an address that the true owner of the domain has registered with a mail exchange authority. Receiver system 20 receives a response from the address that the mail exchange network correlates to the domain. If the response indicates that the certificate is associated with the true owner of the domain, receiver system 20 authenticates sender system 10 as the true owner of the domain based on the response. After validating the certificate, receiver system 20 may use the certificate, for example, for communicating encrypted emails with sender system 10 (or for any other purpose that may customarily require the use of a trusted certificate).

Sender system 10 may comprise any suitable component(s), such as one or more of user device 102 and appliance 104, which can be communicatively connected using network 106. User device 102 can be, for example, a personal computer that includes a processing unit, one or more non-transitory storage media (e.g., read only memory, random access memory, etc.), and a communications interface (e.g., circuitry to enable wireless, wired, optical, and/or any other type of communications). User device 102 may also include one or more user interfaces, which in the present example include a display screen and a keyboard. Software, firmware and/or other types of executable code may be stored by user device 102.

User device 102 may also include software, firmware and/or other forms of executable code that can enable the corresponding hardware to perform the respective functions of the user devices discussed below. For example, user device 102 may store and run executable instructions that enables user device 102 to generate, send and receive emails (locally and/or using web-based applications), generate public/private key pairs, generate certificates, access and download network content, conduct VoIP communications, send and/or receive SMS messages, conduct FaceTime® communications, among other things. Although user device 102 is shown in FIG. 1 as being a personal computer, user device 102 can be any type of network device or combination of devices, including one or more wireless telephones, personal digital assistants, laptop computers, tablet computers, among others, that the user may use to, e.g., send and receive email messages.

Appliance 104 can include one or more servers that facilitate the transmission and delivery of email messages to and/or from user device 102. For example, appliance 104 can be a relay server, such as a Symantec Brightmail® Gateway appliance. In addition to facilitating the transmission of email messages, appliance 104 can be configured to provide outbound and/or inbound email security, including email encryption/decryption, anti-spam and/or anti-virus protection, filter email messages based on email address content (and/or other information) and/or detect/prevent data loss during transmission.

In some embodiments, network 106 is a secured intranet or other communications path that enables user device 102 to privately communicate with appliance 104. Additionally or alternatively, network 106 can include at least one of the Internet, a cellular network, a direct connection, any other type of network or communications connection, or a combination thereof.

User device 102 and/or appliance 104 can also be configured to communicate with network 108. Network 108 is shown in FIG. 1 as being a public network, such as the Internet, but may also or alternatively include any other type of network, such as those discussed above. Network 108 can include one or more network devices, such as domain name system ("DNS") resources, that facilitate the transmission of emails across public networks. For example, network 108 can include infrastructure that associates domain names with networking equipment for the purpose of addressing these devices worldwide by translating human-readable domain names (e.g., zix.com) to a corresponding Internet protocol ("IP") address. A user, for example, can enter a uniform resource locator ("URL") into a web browser running on user device 102, and user device 102 can be configured to communicate with network 108 and download content associated with the URL. As another example, user device 102 can be configured to download and upload data related to public keys, private keys, certificates, and other information over network 108 without utilizing appliance 104.

In some embodiments, user device 102 can be configured to utilize services performed by appliance 104 before accessing network 108. For example, appliance 104 may be configured to encrypt and/or decrypt emails being sent and/or received by user device 102. In some embodiments, appliance 104 may only provide security services to emails associated with one or more particular email domains. To enable appliance 104 to receive inbound and/or outbound email messages for one or more specific domains, a DNS resource can associate appliance 104 as a mail server that accepts email for the one or more specific domains. For example, a directory and/or other mapping approach may be used to associate one or more server IP addresses with one or more domain names.

As discussed above, in certain embodiments, sender system 10 sends a certificate to receiver system 20. The certificate may be sent by any suitable component of sender system 10 (e.g., user device 102, appliance 104, etc.). The certificate identifies sender system 10 as owning a domain and may be self-signed by sender system 10 or signed by a certificate authority. Receiver system 20 authenticates whether sender system 10 is the true owner of the domain based on messaging communicated via a mail exchange network. For example, as further discussed below, receiver system 20 encrypts a secret message using a public key received in the certificate and authenticates the sender system 10 if the true owner of the domain correctly decrypts and returns the secret message. The authentication may be performed independently of a certificate authority or, in certain embodiments, in addition to authentication of the certificate based on a trusted relationship with the certificate authority.

Receiver system 20 may comprise one or more of: certificate server 110, email server 112, database 114, and/or any other components operable to perform functionality of receiver system 20. Certificate server 110 and email server 112 may also be connected to network 108. Receiver system 20 can be configured to, among other things, verify whether sender system 10 or a component of sender system 10 (e.g., user device 102 or appliance 104) is authorized to distribute, encrypt/decrypt, and/or perform any other function related to email messages addressed to or from accounts of one or more particular email domains. Examples of procedures and functional steps, which receiver 20 can be configured to execute to verify the authority of sender system 10 to provide services for one or more particular email domains, are discussed in connection with FIGS. 4A-6. Receiver system 20 can include hardware, such as one or more processing units, non-transitory storage media, and/or communications circuitry. Additional examples of hardware that may be included in receiver system 20 (or components thereof, such as certificate server 110 or email server 112), and exemplary interconnections of the hardware, are discussed in connection with FIG. 2.

In some embodiments, certificate server 110 can have access to one or more external storage devices, such as that included in database 114. Database 114 may be configured to, for example, store, upload and receive data from only certificate server 110. In other embodiments, database 114 may be configured to, e.g., store, upload and receive data from certificate server 110 as well as one or more other devices. System 100 may include one or more other databases (not shown) configured to, e.g., store, upload and receive data to any suitable component.

To facilitate the sending and/or receiving of email messages, email server 112 can, for example, be configured to implement the simple mail transfer protocol ("SMTP"), the post office protocol ("POP"), the internet message access protocol ("IMAP"), and/or any other suitable protocol. For example, certificate server 110 may use email server 112 to send emails to appliance 104, user device 102, and/or any other properly configured network device (not shown). Email server 112, although shown in FIG. 1 as being a separate network device, can be incorporated into certificate server 110 in some embodiments (not shown).

Figure 2:
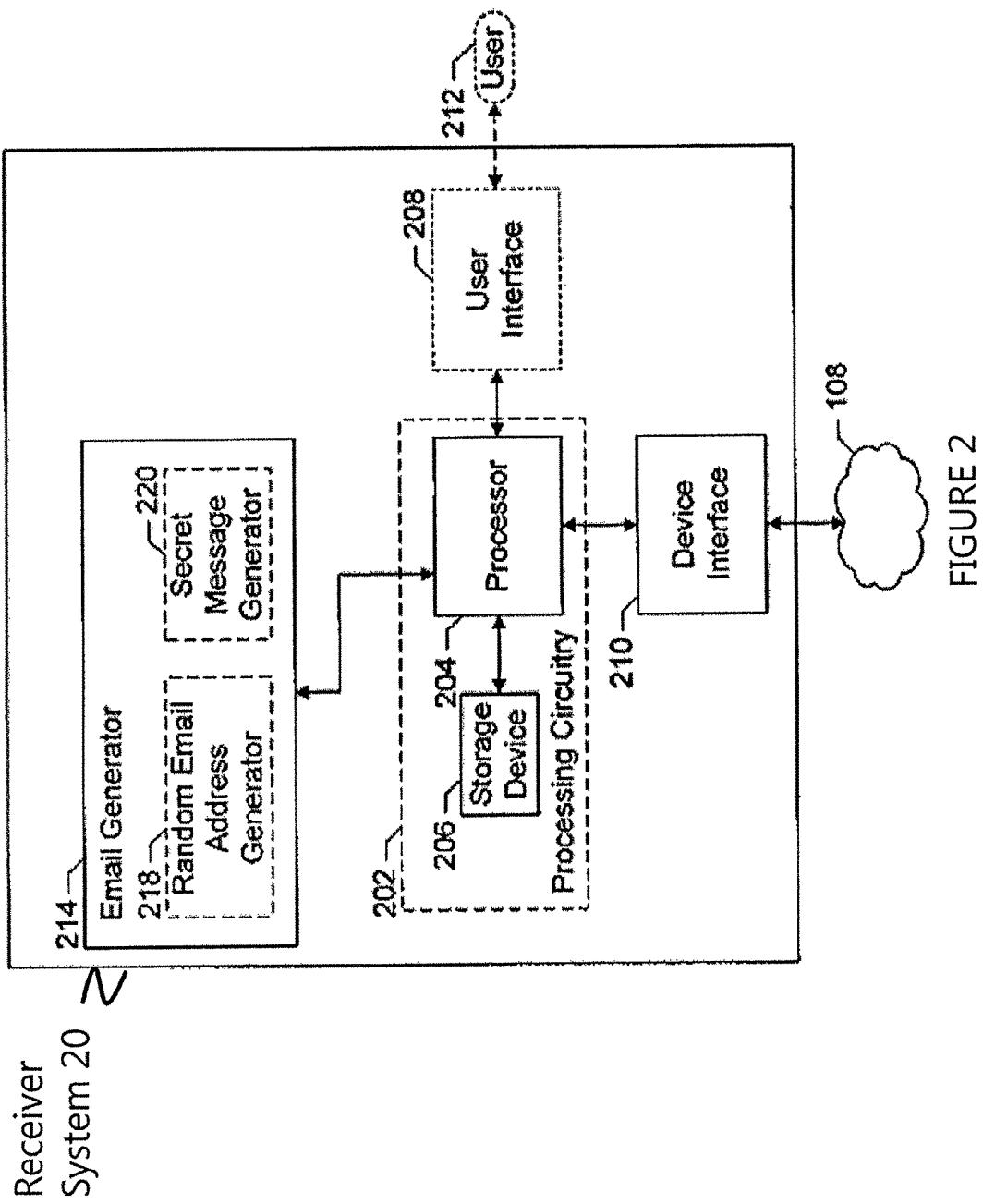
FIG. 2 illustrates an example of components of the receiver system described with respect to FIG. 1, in accordance with certain embodiments.

FIG. 2 shows circuitry and other components of receiver system 20, in accordance with some embodiments. In certain embodiments, the circuitry and other components may be included in an apparatus, such as certificate server 110, or distributed among more than one apparatus (such as certificate server 110, email server 112, database 114, and/or other network device, server, proxy, etc.). Accordingly, some embodiments of the present invention may be embodied wholly at a single device (e.g., certificate server 110) or by devices in a client/server relationship (e.g., certificate server 110 and one or more clients). Furthermore, it should be noted that the devices or elements described below may not be mandatory and thus some may be omitted in certain embodiments. Moreover, additional components may be included to support the functionality described as being performed by receiver system 20. The elements of receiver system 20 can be used authenticate a sender system 10. The receiver system 20 may authenticate the sender system 10 for any suitable purpose, such as to support emailing functions for a particular domain and provision sender system 10 to provide security services for email messages associated with the domain.

Receiver system 20 may include or otherwise be in communication with processing circuitry 202 that is configured to perform data processing, application execution and other processing and management services according to some exemplary embodiments of the present invention. Processing circuitry 202 may include processor 204, and storage device 206. Processing circuitry 202 may be in communication with or otherwise configured to control user interface 208 and device interface 210. As such, processing circuitry 202 may be embodied as a circuit chip (e.g., an integrated circuit chip) configured (e.g., with hardware, software or a combination of hardware and software) to perform operations described herein. However, in some embodiments, processing circuitry 202 may be embodied as a portion of a laptop computer, workstation, mobile telephone, or other type of computing device(s). In situations where processing circuitry 202 is embodied as a server or at a remotely located computing device, user interface 208 may be disposed at another device (e.g., at a computer terminal or client device such as user device 102) that may be in communication with processing circuitry 202 via device interface 210 and/or a network (e.g., network 108).

User interface 208 may be in communication with processing circuitry 202 to receive an indication of a user input at user interface 208 and/or to provide an audible, visual, mechanical or other output to user 212. As such, user interface 208 may include, for example, a keyboard, a mouse, a joystick, a display, a touch screen, a microphone, a speaker, a cell phone, and/or one or more other input/output mechanisms. In exemplary embodiments, user interface 208 may include interface options for changing parameters and other configurations of certificate server 110.

Device interface 210 may include one or more interface mechanisms for enabling communication with other devices and/or networks. In some embodiments, device interface 210 may comprise any means embodied in hardware, software, or a combination of hardware and software that is configured to receive and/or transmit data from/to a network and/or any other device or module in communication with processing circuitry 202. In this regard, device interface 210 may include, for example, an antenna (or multiple antennas) and supporting hardware (e.g., circuitry) and/or software for enabling communications with a wireless communication network and/or a communication modem or other hardware/software for supporting communication via cable, digital subscriber line (DSL), universal serial bus (USB), Ethernet and/or other means for communication. In situations where device interface 210 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an exemplary embodiment, storage device 206 may include one or more tangible, non-transitory memory devices such as, for example, volatile and/or non-volatile memory that may be either fixed or removable. Storage device 206 may be configured to store information, data, applications, instructions or the like for enabling certificate server 110 to carry out various functions in accordance with exemplary embodiments of the present invention. For example, storage device 206 can be configured to buffer input data for processing by processor 204. Additionally or alternatively, storage device 206 could be configured to store instructions for execution by processor 204, such as instructions for performing the methods discussed in connection with FIGS. 4A-6. As yet another example, processor 204 may store data in database 114, as well as a variety of files, contents, and/or data sets (including encrypted/decrypted secret messages associated with domain names and/or public keys), among other things. The contents of storage device 206 and/or database 114 may include applications (e.g., sender system authenticating applications and/or other types of service applications) that are stored for execution by processor 204 to carry out functionality associated with each respective application.

Processor 204 may be embodied in a number of different ways. For example, processor 204 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an exemplary embodiment, processor 204 may be configured to execute instructions, such as instructions for performing the methods discussed in connection with FIGS. 4A-6, stored in storage device 206 or otherwise accessible to processor 204. As such, whether configured by hardware or software methods, or by a combination thereof, processor 204 may represent an entity (e.g., physically embodied in circuitry) capable of performing operations according to embodiments of the present invention while configured accordingly. Thus, for example, when processor 204 is embodied as an ASIC, FPGA or the like, processor 204 may be specifically configured hardware for conducting the operations described herein, including performing the methods discussed in connection with FIGS. 4A-6. Alternatively, as another example, when processor 204 is embodied as an executor of software instructions, the instructions may specifically configure processor 204 to perform the operations described herein.

In some embodiments, processor 204 (or processing circuitry 202) may be embodied as, include or otherwise control email generator 214. Email generator 214 may include any suitable means, such as a device or circuitry operating in accordance with software or otherwise embodied in hardware or a combination of hardware and software (e.g., processor 204 operating under software control, the processor 204 embodied as an ASIC or FPGA specifically configured to perform the operations described herein, or a combination thereof) thereby configuring the device or circuitry to perform the corresponding functions of email generator 214, as described below.

Email generator 214 may be configured to enable the generation of an email to a random email address that includes an encrypted secret message. The random email address may be generated by random email address generator 218 and the secret message may be generated by secret message generator 220. In some embodiments, email generator 214 (or processor 204 or processing circuitry 202, among others) may be embodied as, include or otherwise control random email address generator 218 and/or secret message generator 220. Random email address generator 218 and/or secret message generator 220 may each be any means such as a device or circuitry operating in accordance with software or otherwise embodied in hardware or a combination of hardware and software, thereby configuring the device or circuitry to perform the corresponding functions of random email address generator 218 and secret message generator 220, respectively, as described below.

Figure 3:
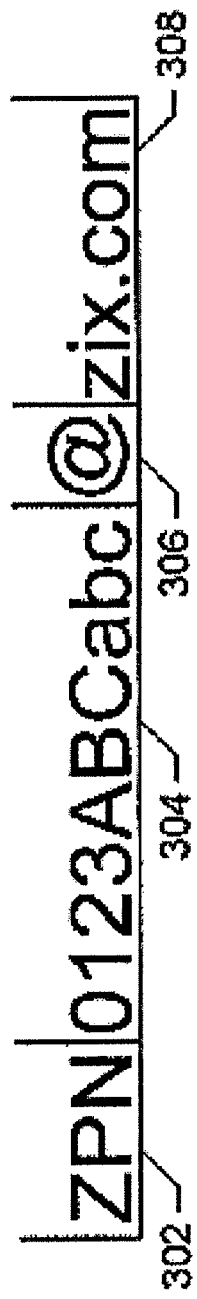
FIG. 3 illustrates an example format for an email address, in accordance with certain embodiments.

In some embodiments, random email address generator 214 can generate an email address that is formatted as shown in FIG. 3. Prefix 302 can be included in each email address generated by random email address generator 214. A sender system, such as sender system 10, can be configured to identify email addresses that include prefix 302 and determine that the email address includes a secret message. Prefix 302 can be consistent and, in some embodiments, identical, among more than one randomly generated email address. For example, each email address generated by random email address generator 214 can include a three-letter string of symbols, such as "ZPN." However, other predefined strings of symbols may be generated in other embodiments.

In other embodiments, random email address generator 214 can be configured to generate a secret message identifier, which may include one or more differing strings of one or more characters, in a predetermined position or positions, that indicate to a remote device that a secret message is included in the email message. For example, prefix 302 can be the same for every random email address generated. As another example, prefix 302 may be the same for the same types of email messages, but differ among some types of email messages being generated. As yet another example, all email messages addressed to a first domain and/or sender system can have a similar or the same prefix 302, while email messages being sent to other domains and/or sender systems can have a different prefix 302. Additionally, in some instances, a common set of symbols included in an otherwise randomly generated email address can be associated with other common characteristics of the message, such as the sender of the message, the intended recipient, and/or other aspects of the process and systems being used.

Prefix 302 is shown in FIG. 3 as a string of three uppercase letters (ZPN) at the beginning of the generated email address. In some embodiments, prefix 302 can include more or less symbols (alphanumeric or otherwise) and/or be located at different places within the generated email address (e.g., after random portion 304, within random portion 304, elsewhere within the generated email address, or combination thereof). Also, in some embodiments (not shown), more than one common set of characters can be included in a random email address generated by random email address generator 214. For example, instead of or in addition to prefix 302, a suffix, comprising one or more characters (not shown), can be included after random portion 304 and before symbol 306 to provide the same identification functionality discussed herein in connection with prefix 302, such that the sender system is alerted to the presence of a secret message and knows what to expect and/or look for. As another example, prefix 302's symbols can be distributed throughout random portion 304 in predefined manner (e.g., "Z" being after the second random symbol, "P" being after the fifth symbol, and "N" being after the eighth random symbol. A sender system or other remote system (or device) can then be preconfigured to parse the destination email address of each incoming email message, look for prefix 302 (at the position it is supposed to be located within the randomly generated email address), and determine whether the destination email address includes one or more predetermined characters in one or more predetermined locations, thereby indicating there is a secret message in the body of the email message.

While the body of the email message, as referred to herein, includes the payload portion of the email message comprising data to be transformed into user-readable information, in some other embodiments, the body of the email or other type of electronic message may similarly be the payload portion (as opposed to, e.g., the routing portion) of the message that includes the data to be presented to the user. For example, in some electronic messaging systems, the routing devices may be preconfigured to ignore the body of at least some messages, unless prefix 302 (and/or other type of secret message identifier) is included in the routing portion of the message and is recognized by at least one of the routing devices (such as the appliance 104 of sender system 10). For example, the body of a VoIP message may include the portion of the message dedicated to carrying data representing the audio signal being transported.

In addition to or instead of parsing the destination email address for a secret message identifier (such as, e.g., prefix 302 and/or other nonrandom character(s) in a predetermined position of the otherwise random destination email address), one or more remote devices can also be configured to parse other data to determine whether the email message may or may not include a secret message to be decrypted. For example, a remote device can be preconfigured to parse other aspects of the routing information (e.g., one or more origination email addresses, metadata associated with the email, etc.), the electronic message's payload data (e.g., the body of the email, payload metadata, etc.), and/or any other information (such as data independent from and/or external to the electronic message, which may include data posted to a blog or other website, etc.). By parsing one or more other fields in addition to or instead of the destination email address, a greater level of security (due to the potential of alternative embodiments), speed, and/or efficiency may be realized.

Random email address generator 218 can also be configured to generate a random set of symbols to be used as at least part of a destination email address. The random set of symbols can be included in, for example, random portion 304. The random set of symbols can comprise, e.g., a cryptographically random set of alphanumeric characters, such as ten alphanumeric characters shown in FIG. 3. In some embodiments, random email address generator 218 can be configured to select and/or generate symbols independent of time. In other embodiments, random email address generator 218 can generate random symbols using a time dependent protocol, or a combination of time dependent and time independent protocols (e.g., some symbols being time dependent and others time independent). The symbols can be, for example, Base64, Base128, Base256, or based on any other suitable computer readable encoding scheme (such as, e.g., those consistent with the current remote serial communications, "RSC", system).

Domain portion 308 of the destination email address can be generated based on, for example, an identification of an email domain that random email address generator 218 receives. For example, processing circuitry 202, random email address generator 218 and/or any other component of receiver system 20 can determine the domain name based on the certificate received from a sender system 10.

While the domain of the email message, as referred to herein, can be used to route an email message to a destination sender system, other types of "domains" can be used to route other types of electronic messages. In this regard, as referred to herein in relation to some embodiments, a message's "domain" can generically refer to routing information, or at least a portion thereof, that can be mapped to one or more sender systems used to provide encryption services for electronic messages.

Returning to FIG. 2, email generator 214 may also include secret message generator 220. In some embodiments, secret message generator 220 can be configured to compile a secret message to be emailed to the email address created by random email address generator 218. The secret message can comprise one or more symbols. For example, the unencrypted secret message can comprise one or more tokens, a string of one or more random symbols, and/or human-readable set of information (e.g., word, phrase, sentence, etc.). In some embodiments, the secret message can include two or more positive integers, provided by the Java Class SecureRandom, that are concatenated together. In other embodiments, some or the entire secret message may be retrieved from database 114 and/or other storage device, rather than or in addition to being independently generated by secret message generator 220.

Secret message generator 220 may also be configured to encrypt the secret message generated, retrieved, or otherwise compiled by secret message generator 220. For example, secret message generator 220 may also be configured to encrypt the secret message using a public key received in the certificate from sender system 10 (which, for example, may be received from user device 102 or appliance 104 of sender system 10). In certain embodiments, secret message generator 220 encrypts the secret message using a public key that the sender system 10 provided in a self-signed certificate. In other embodiments, secret message generator 220 encrypts the secret message using a public key that the sender system 10 provided in a certificate signed by a certificate authority. The public key used by secret message generator 220 may be retrieved from a database, such as database 114. In database 114, the public key may be associated with, for example, one or more domain names, user devices, user identifying information (e.g., username and password), time stamps, expiration dates, and/or any other available data.

Secret message generator 220 may also be configured to process the encrypted and/or unencrypted secret message for storage. For example, rather than store the secret message, the secret message can be inputted into a hash function and the output of the hash function, sometimes referred to herein as the "hash value," can instead be stored in a database, such as database 114. The hash value and/or other data derived from the secret message may then be linked to other data (such as the public key and/or domain name) associated with the secret message.

Receiver system 20 sends an electronic message comprising the encrypted secret message via the mail exchange network. The mail exchange network uses domain portion 308 to correlate the electronic message to an address that a true owner of the domain has registered with a mail exchange authority. The true owner may be configured to decrypt and return the secret message, for example, in response to recognizing prefix 302 as an indicator that the electronic message comprises a secret message from receiver system 20. Assuming that the true owner of the domain (the system to which receiver system 20 sends the secret message via the mail exchange network) is the same as the sender system 10 (the system from which receiver system 20 received the certificate comprising the public key and an assertion of ownership of the domain), the true owner/sender system 10 will have the correct private key for decrypting the secret message. The true owner/sender system 10 sends receiver system 20 the decrypted secret message. In response to receiving the correct decrypted secret message, receiver system 20 authenticates sender system 10 as the true owner of the domain. Receiver system 20 can also be configured to initiate the preparation and equipping of sender system 10 to allow receiver system 20 to provide new and/or enhanced services, security or otherwise, to the sender system 20.

Processing circuitry 202, processor 204, email generator 214, and/or any other circuitry that may be incorporated into one or more apparatuses in accordance with some embodiments discussed herein, may operate under control of a computer program product and be used to control mechanical components and/or exchange transitory signals containing data. For example, a computer program product can be implemented on a computer-readable storage medium, such as storage device 206.

As will be appreciated, any such computer program instructions may be loaded onto a computer or other programmable apparatus, e.g., processor 204, to produce a machine, such that the instructions which execute on the computer or other programmable apparatus create means for implementing the functions described herein. These computer program instructions may also be stored in a computer-readable memory that may cause a computer or other programmable apparatus to be configured to function in a particular manner, such that the instructions stored in the computer-readable memory produce an article of manufacture including instruction means to implement the functions described herein. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions described herein.

For purposes of explanation, example components of receiver system 20 have been described. Each device within system 100, such as user device 102, appliance 104, certificate server 110, email server 112, and so on, can include any suitable processor(s) (e.g., similar to processor 204), memory (e.g., similar to storage device 206), and interface(s) (e.g., similar to user interface 208 or device interface 210) operable to perform the functionality of that particular device.

Figure 4B:
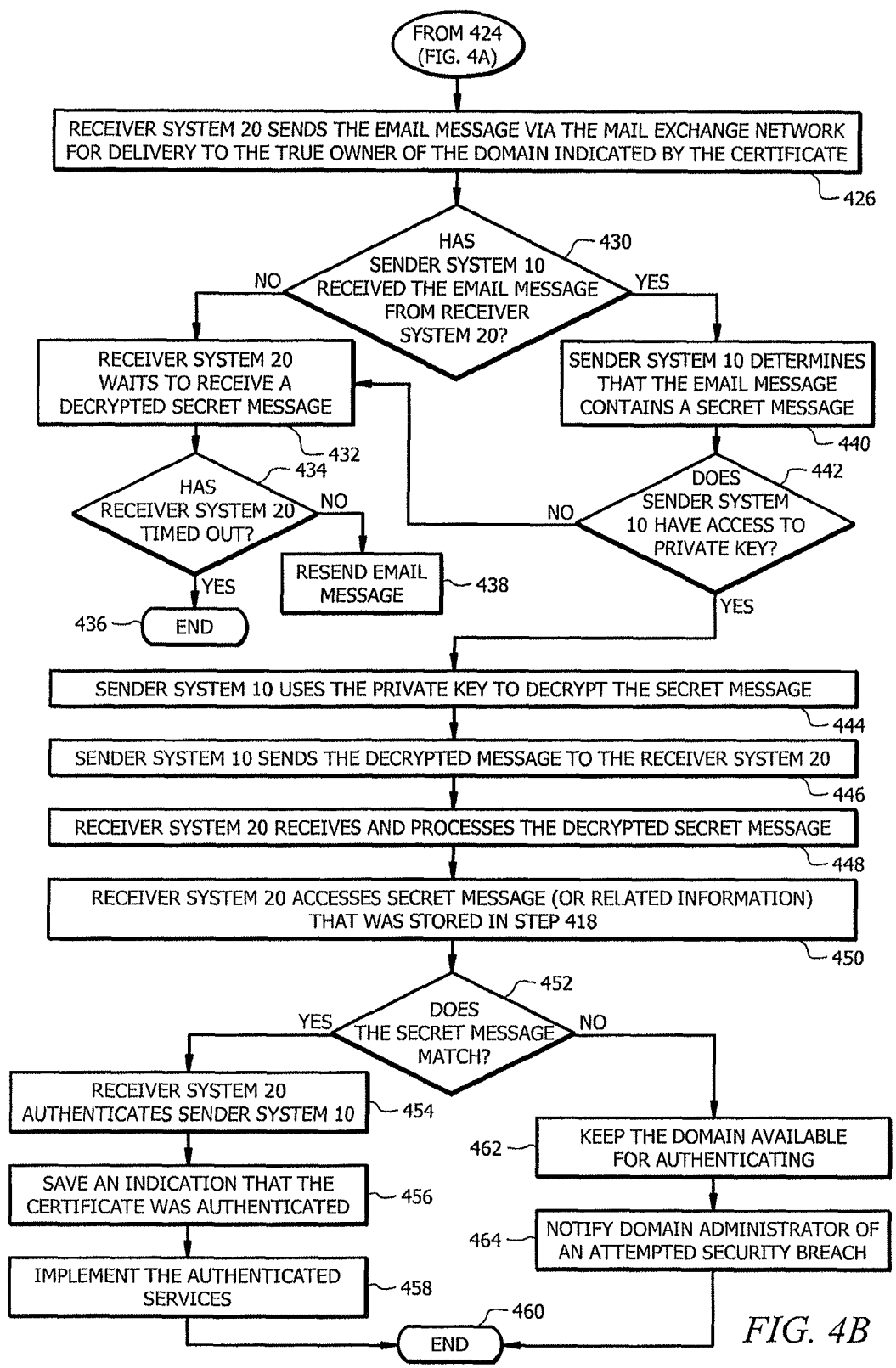

FIGS. 4A-4B show exemplary methods for executing instructions that may be used to authenticate a sender system. In certain embodiments, the sender system may be authenticated in order to provide services, such as email security related services. FIG. 4A shows process 400 that starts at 402.

At 404, sender system 10 receives or generates a certificate comprising public key and an indication that sender system 10 owns a domain. As an example, a user device, such as user device 102 of sender system 10, can be configured to execute instructions for generating a public key and private key pair as well as a certificate. The instructions may have been previously stored on the user device and/or downloaded from a network device. The public key and private key pair can be generated using, for example, the RSA algorithm comprising a three thousand bit string. In other embodiments, any other suitable bit string and/or algorithm may be used. Also, in some other embodiments, a device other than or in addition to user device 102 can be configured to execute instructions for generating the public, private key pair, certificate and/or other security tools used in process 400.

Optionally, in an embodiment where sender system 10 generates or receives the certificate at user device 102, the user device 102 can be configured to send the public key and/or private key to an appliance, such as appliance 104 of sender system 10, at step 406. Appliance 104 may be associated with an email domain the user device can access email messages addressed thereto. For example, user device may be able to access emails, stored locally and/or remotely, that are addressed to the domain named "zix.com" and, at 406, the user device may provide the public/private key pair, or just the private key, to an appliance that serves the zix.com domain. In some embodiments, at least the private key can be communicated to the appliance over a secure communications path.

Optionally, at 408, a determination is made as to whether or not the private key and/or public key were successfully sent to the appliance 104. The user device, the sender system, and/or other device(s) can be configured to make the determination at 408. For example, the user device can be configured to generate a confirmation indicating that the user device successfully sent the public and/or private key to the sender system. As another example, the sender system can also or instead generate a confirmation that the public key and/or private key have been successfully received by the sender system. In response to determining at 408 that the public key and/or private key have yet to be successfully pushed to the sender system, the user device may wait at 410 for the confirmation of a successful push to the sender system. Process 400 then returns to 408.

In some embodiments, rather than returning to 408, process 400 can proceed to 406 and attempt to resend the public key and/or private key to the appliance. In yet other embodiments, rather than return to 408 or 406, process 400 can return to 404, a new public key and/or private key can be generated and pushed to the appliance at 408. After executing 404, 406 and/or 408 a predetermined number of times (e.g., 5, 10, or any other number), process 400 can end and the system can indicate that an error occurred in pushing the public key and/or private key to the appliance.

In response to determining at 408 that the public key and/or private key have been successfully provided to the appliance, process 400 proceeds to 412. In an alternative embodiment, the method may proceed directly from step 404 to step 412 (as indicated by the dashed line in FIG. 4A). For example, in certain embodiments, steps 406-410 either can be skipped or can be performed in parallel to step 412. The sender system 10 (e.g., user device 102, appliance 104, and/or other device or component) can be configured to execute instructions for sending receiver system 20 (e.g., certificate server 110, email server 112, and/or other device or component) the certificate from step 404. The certificate may include and/or otherwise be associated with the public key and/or domain name. In some embodiments, the receiver system 20 can send the certificate, public key and/or domain name over a public and/or private network using any suitable protocol and/or messaging system.

At 414, the receiver system 20 can store the certificate, public key and/or domain name in a database and/or other storage device. For example, the certificate server can map the certificate and/or public key to at least one domain name in a multi-dimensional data array that uses pointers, joins and/or other type(s) of data linking mechanisms.

At 416, the receiver system 20 can be configured to execute instructions for generating a message using, among other things, the public key received at 412 to encrypt the message. For example, as discussed in connection with FIG. 2, the secret message can be an encrypted token comprising two positive secure random long integers that are concatenated together and encrypted using the public key generated by (or received from) sender system 10. The encryption process can be at least partially performed by the receiver system 20 and can be specific to the domain name received at 412.

At 418, the receiver system 20 can be configured to execute instructions for storing the secret message (as encrypted and/or as unencrypted) with the public key and/or domain name. For example, the message can be linked to the public key and/or domain name for future reference. In some embodiments, rather than or in addition to storing the secret message, data derived from the secret message may be stored. For example, the unencrypted secret message may be inputted into a hash function (such as, e.g., the Message-Digest algorithm 5, or "MD5") and the outputted hash value may be stored and/or linked to the public key and/or domain name for future reference. As such, in some embodiments, the secret message (encrypted or unencrypted) may never be stored by the receiver system 20.

The receiver system 20 can be configured to execute instructions at 420 for generating a random sequence of symbols. The random sequence of symbols can be used by receiver system 20 to generate a random email address as described above and as shown at 422. The domain name received at 412 and/or nonrandom symbols can also be used to generate the email address at 422. At 424, the receiver system 20 can be configured to insert the encrypted secret message into the body of the email message addressed to the random email address generated at 422.

Process 400 continues in FIG. 4B, where at step 426 the generated email message can then be sent via the mail exchange network for delivery to the true owner of the domain indicated by the certificate. In certain embodiments, the true owner is sender system 10 (i.e., if the certificate's indication that sender system 10 owns the domain is accurate). For example, an outgoing email server, such as email server 112 of receiver system 20, sends the email message to the random email address using, for example, DNS resources.

At 430, a determination is made whether sender system 10 has received the email from receiver system 20. In response to the sender system 10 not receiving the email message, the receiver system 20 can wait at 432 to receive a decrypted secret message. However, since the sender system 10 did not receive the email message, the sender system does not generate and send a decrypted secret message. At 434, a determination is made as to whether or not the receiver system 20 has timed out waiting to receive the decrypted message. In response to determining that the receiver system 20 has timed out, process 400 ends at 436.

In response to determining that the receiver system 20 has not timed out at 434, the receiver system 20 can be configured in some embodiments to execute a resending protocol at 438. The resending protocol executed at 438 can be optional (like other functionality discussed herein) and can include instructions for resending the encrypted secret message to the random email address one or more times over a given period of time before the receiver system 20 determines it has timed out. For example, the receiver system 20 can resend the generated email message every fifteen minutes for two hours, without receiving a response or other indication that the sender system 10 has received the email, before timing out. In some embodiments, the resend protocol of 438 can be executed in response to receiving a delivery failure notification, rather than or in addition to waiting for the decrypted secret message to be received at 432. In some embodiments, the receiver system 20 returns to step 432 after resending the email message. In some embodiments, the receiver system 20 may repeat step 432 until the receiver system 20 either times out (step 434) or receives the decrypted secret message (step 448).

In response to the sender system 10 receiving the generated email message at 430, the sender system 10 can determine at 440 whether or not the email message contains a secret message. The determination at 440 can be based on, for example, the sender system 10 executing instructions (which may have been previously provided to the sender system 10 by the receiver system 20) for parsing the destination, randomly generated email address for a prefix and/or other nonrandom, predetermined symbols (such as prefix 302 discussed above) that are indicative of the email message containing a secret message. At 442, the sender system 10 can attempt to locate a private key to decrypt the secret message. In response to determining at 442 that the sender system 10 does not have access to the appropriate private key, process 400 returns to 432. In response to determining at 442 that the sender system 10 does have the appropriate private key.

At 444, the sender system 10 uses the private key accessed at 442 to decrypt the secret message. At 446, the sender system 10 can send the decrypted message to the receiver system 20. The decrypted message can be sent using any suitable protocol and/or by any suitable messaging means (including SMS, email messaging, automatic web posting and retrieval, among others).

At 448, the receiver system 20 receives and processes the decrypted secret message sent by the sender system 10. For example, the receiver system 20 may execute a hash function using the received message as an input to the hash function. At 450, the receiver system 20 can then access the database and/or other storage device in which the secret message or processed version thereof was stored at 418. The secret message and/or derived data (such as a hash value derived from the secret message), which may be stored as encrypted and/or decrypted, can be retrieved at 450 using, e.g., the domain name, time stamp, and/or by any other means.

At 452, a determination is made by the receiver system 20 as to whether or not the secret message and/or derived data retrieved from the database matches (e.g., is the same as or is sufficiently similar to) the decrypted secret message received from the sender system 10. In response to determining at 452 that the secret messages match, the receiver system 20 can be configured to execute instructions at 454 for authenticating the sender system 10. In certain embodiments, the authenticated sender system 10 can be provisioned to provide one or more specific services. For example, the sender system 10 can be automatically provisioned (e.g., without user intervention or involvement at least since 404) to provide email encryption services for a particular email domain.

At 456, an indication that the certificate was authenticated can be saved to a database and/or other storage device. The indication saved to the database can indicate, for example, that the sender system 10 has been authenticated. Optionally, in certain embodiments, the indication may further indicate that the sender system 10 has been provisioned to provide security services, including email encryption services, for a particular domain. The receiver system 20 can be configured to ignore future requests to authenticate sender systems and/or other devices for the particular domain.

At 458, the application can implement the authenticated services. For example, the sender system 10 can automatically encrypt and decrypt at least some email messages that are addressed to or from email addresses at the domain. Process 400 can then end at 460.

In response to determining at 452 that the secret message received by the receiver system 20 does not match and is different than the secret message stored in the database and/or other storage device, the receiver system 20 may be configured to not authenticate the sender system 10 to provide services for the domain. At 462, the domain may remain available for authenticating by the receiver system 20.

At 464, the domain administrator may also be notified of an attempted security breach. For example, the domain administrator may be notified via email or otherwise that an unauthorized party attempted to cause some or all email messages addressed to or from the domain to be encrypted. The notification sent at 464 can include authenticating services to the true owner of the domain to help prevent future attacks. The authenticating services may be provided for a fee (e.g., a subscription fee, upfront fee, trial period, and/or any other type of fee structure) or for free (temporarily or permanently). After such period of time, the receiver system 20 can be configured to cancel the authenticating services, the certificate may expire, and a license agreement may be violated, among other things. Process 400 may then end at 466, or if the offer is accepted by the domain administrator start at 402.

Figure 5A:
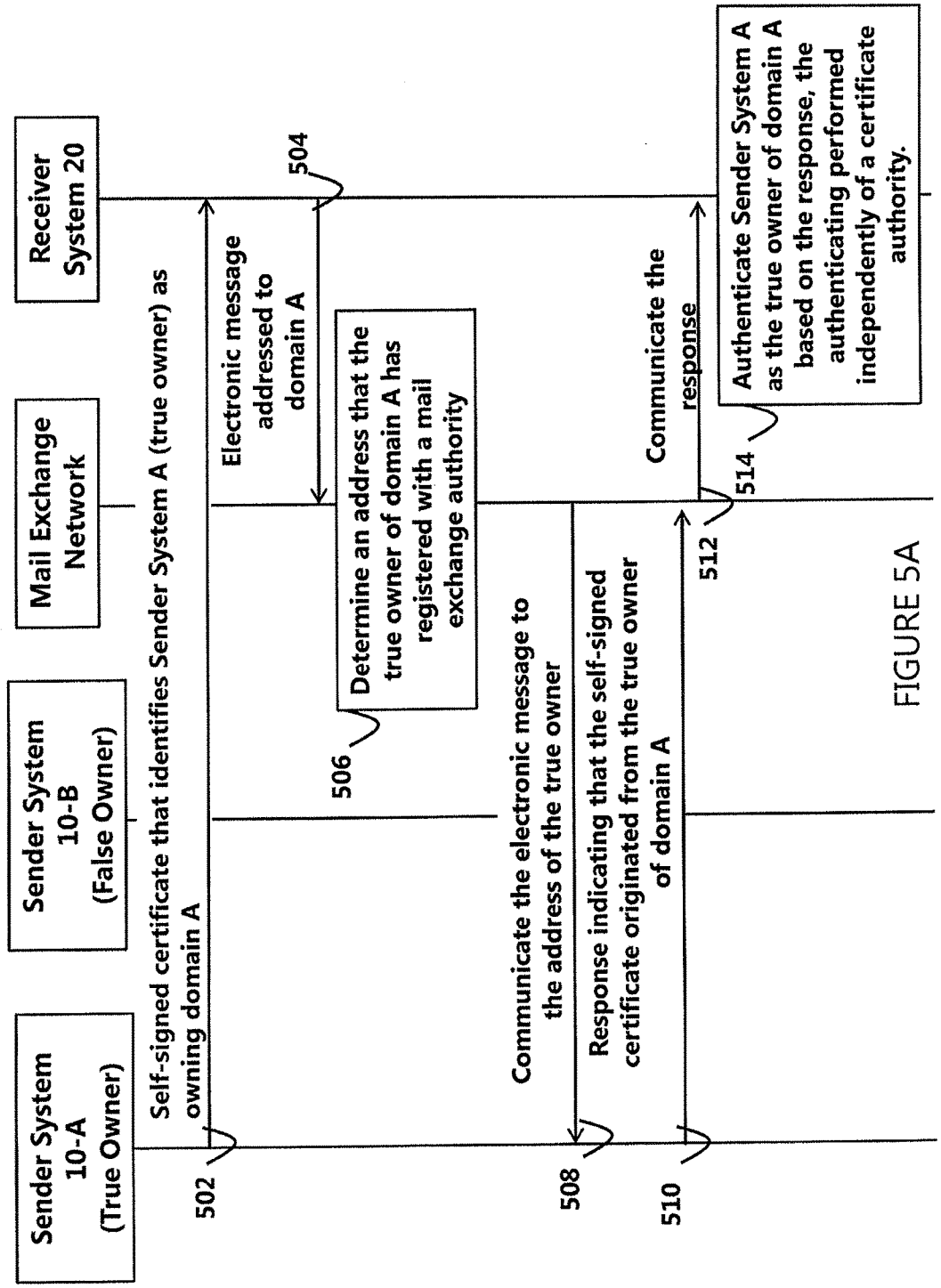
FIGS. 5A-5B illustrate an example of authenticating a sender system as the true owner of a domain, in accordance with certain embodiments.
Figure 5B:
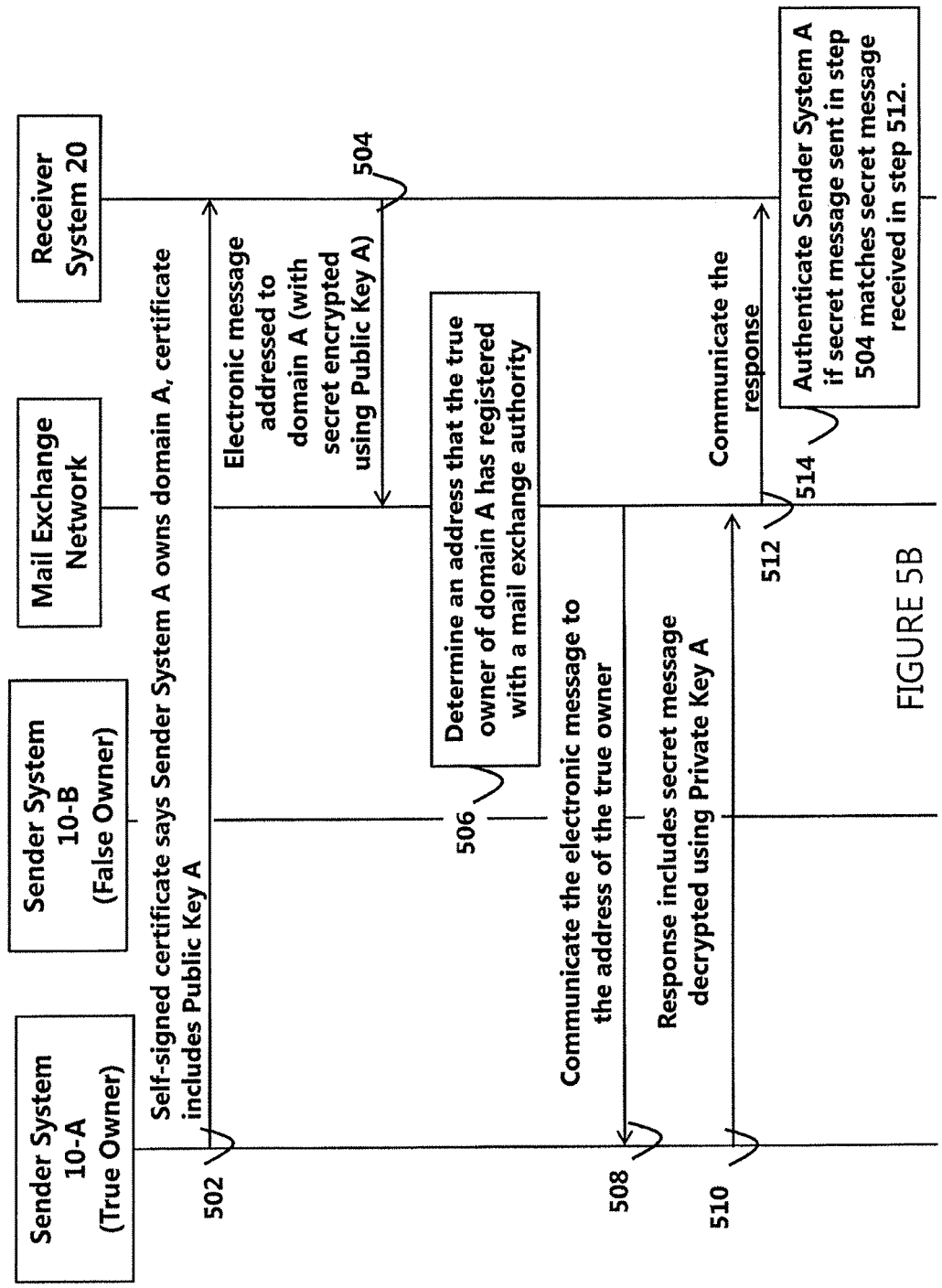
Figure 6:
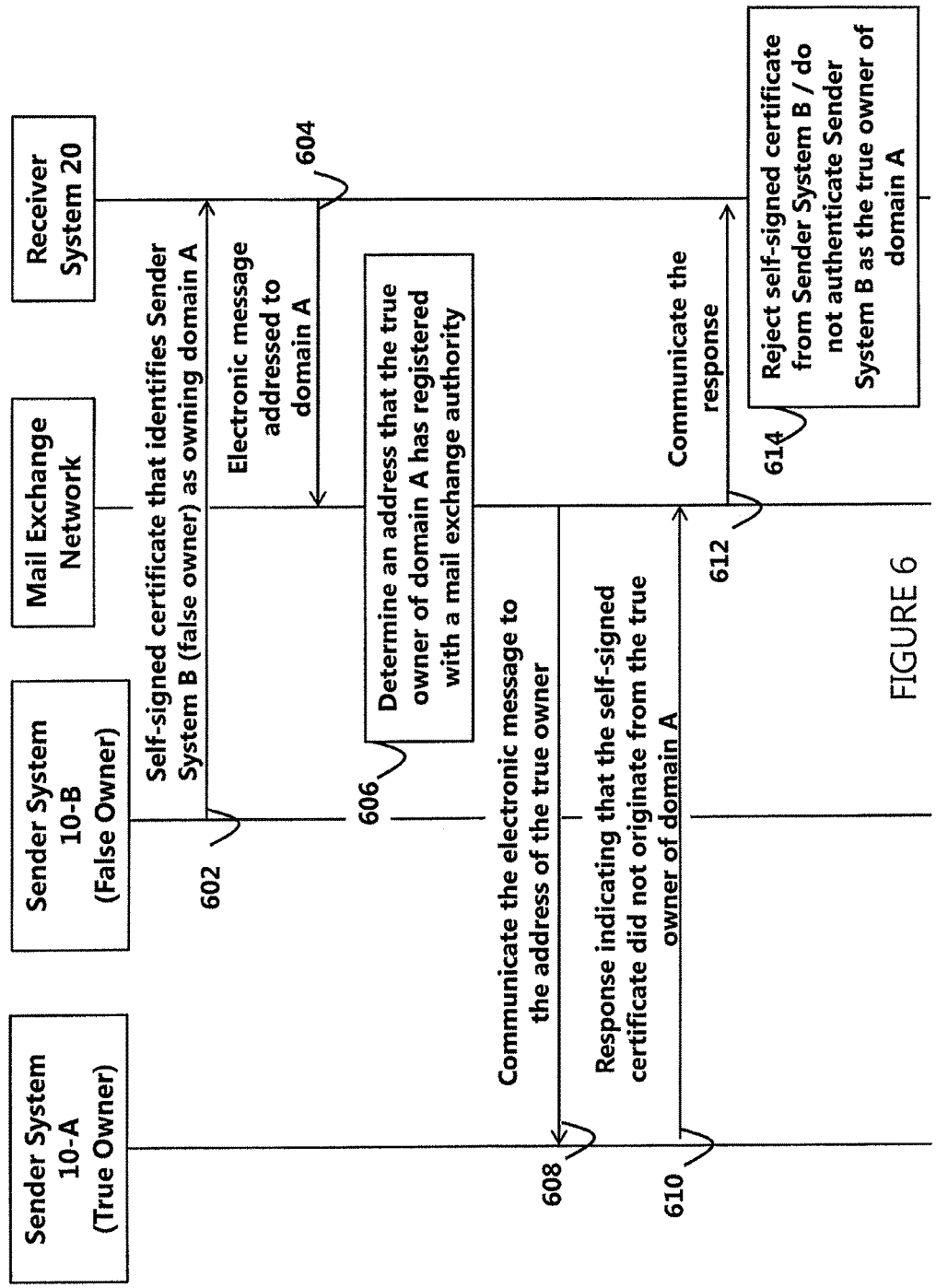
FIG. 6 illustrates an example of rejecting authentication of a sender system that is a false owner of a domain, in accordance with certain embodiments.

FIGS. 5A, 5B, and 6 illustrate examples of the methods that may be performed by receiver system 20. For purposes of example and explanation, the figures describe the use of a self-signed certificate. The same methods could be applied to other types of certificates (other than self-signed certificates). For example, the methods could be applied to a certificate that has been signed by an untrusted certificate authority. The methods could even be applied to a certificate signed by a trusted certificate authority (e.g., as a secondary form of validating the certificate).

FIG. 5A illustrates an example of authenticating a sender system A as the true owner of a domain A. That is, for purposes of the example, sender system A is the true owner of domain A. At step 502, a receiver system receives a self-signed certificate from a sender system A. In certain embodiments, the self-signed certificate is delivered to the receiver system by webservice post or by email. The self-signed certificate may be received from any suitable component of the sender system, such as user device 102 or appliance 104, and may be received by/communicated to any suitable component of the receiver system, such as a certificate server 110 or email server 112. The self-signed certificate is signed by the sender system A and identifies sender system A as owning a domain A. In certain embodiments, the certificate is formatted according to the x.509 specification.

At step 504, the receiver system sends an electronic message to the domain identified in the self-signed certificate (domain A in this example). The electronic message is sent via a mail exchange network. At step 506, the mail exchange network correlates domain A (the domain in the electronic message sent by the receiver system) to an address that a true owner of domain A has registered with a mail exchange authority. In certain embodiments, the mail exchange network uses a DNS MX record to correlate the domain to an IP address registered to the true owner of domain A.

At step 508, sender system A (the true owner of the domain) receives the electronic message via the mail exchange network. At step 510, sender system A sends a response indicating that the self-signed certificate of step 502 originated from the true owner of the domain. At step 512, the mail exchange network communicates the response to the receiver system. At step 514, the receiver system authenticates sender system A as the true owner of the domain based on the response received in step 512. The authentication is performed independently of a certificate authority. Sender system A may then perform any suitable operations of an authenticated system, such as securing web communications, securing email communications, provisioning encryption services for domain A (e.g., provisioning encryption services for a system or component of domain A), and so on.

In certain embodiments, the receiver system may be configured to receive the response message (step 512) within a predetermined period of time. If the receiver system determines that the response is not received within a predetermined period of time, the receiver system may be configured to resend the electronic message (step 504). Resending the electronic message may allow sender system A to respond, for example, in the event that a delay or an error prevented the successful completion of steps 504-512 during the previous attempt. In an alternative embodiment, the receiver system may determine that ownership of the domain is to remain available for authentication if the response message (step 512) is not received within a predetermined period of time. That is, the receiver system may have insufficient information to determine whether domain A is owned by sender system A or another system, so authentication can remain available. Thus, if the receiver system receives a subsequent certificate indicating ownership of domain A, the receiver system may determine whether the subsequent certificate is trusted and the owner is authenticated.

In certain embodiments, after authenticating sender system A as the true owner of the domain, the receiver system may receive another request to authenticate a different sender system B as the true owner of the domain A. For example, sender system B may send a certificate to the receiver system claiming that system B is the owner of domain A. In response, receiver system A may deny the request to authenticate the different sender system B as the true owner of domain A based on having already authenticated the original sender system A as the true owner of domain A. Thus, in certain embodiments, the receiver system need not initiate step 504 with respect to sender system B if the receiver system has already authenticated sender system A as the true owner of domain A.

FIG. 5B is similar to FIG. 5A. In particular, FIG. 5B shows the steps of FIG. 5A as applied to a public key exchange. At step 502, the receiver system receives the self-signed certificate from sender system A. In this example, the self-signed certificate includes a public key A and may also include information indicating a time period during which the self-signed certificate is valid (such as an expiration date or a number of days until the self-signed certificate expires).

At step 504, the receiver system sends the electronic message to domain A via the mail exchange network. In certain embodiments, the receiver system comprises email generator 214 discussed above. Email generator 214 may generate the electronic message. For example, email generator 214 may include a random email address generator 218 that generates an email address to [prefix][random_portion]@domainA.com, wherein the prefix indicates that the email contains a secret message. Email generator 214 may also include a secret message generator 220 that generates the secret message portion of the electronic message and encrypts the secret message using the public key A received in step 502.

At step 506, the mail exchange network correlates domain A to an address that a true owner of domain A has registered with a mail exchange authority. At step 508, sender system A (the true owner of the domain) receives the electronic message via the mail exchange network. At step 510, sender system A sends a response indicating that the self-signed certificate of step 502 originated from the true owner of the domain. For example, because sender system A is the true owner of domain A, sender system A has a private key A that corresponds to the public key A that encrypted the secret message (i.e., the public key A of the self-signed certificate sent in step 502). Thus, sender system A is able to decrypt the secret message received in the electronic message (step 508) and send the decrypted secret message to the receiver system via the mail exchange network (steps 510-512). At step 514, the receiver system authenticates sender system A as the true owner of domain A based on receiving the correct secret message in the response of step 512 (i.e., the secret message decrypted by sender system A matches the secret message encrypted by the receiver system).

Similar to certain embodiments described with respect to FIG. 5A, the receiver system may be configured to receive the secret message as decrypted by domain A within a predetermined period of time. If the secret message as decrypted by domain A is not received within a predetermined period of time, the receiver system can resend the encrypted secret message to the domain A or determine that ownership of domain A is to remain available for authentication.

FIG. 6 provides an example of rejecting a self-signed certificate and not authenticating a sender system B that falsely claims to own domain A. At step 602, a receiver system receives a self-signed certificate from a sender system B. The self-signed certificate is signed by the sender system B and identifies the sender system as owning a domain A. However, in the example, sender system B is a false owner because it does not actually own domain A. At step 604, the receiver system sends an electronic message to the domain identified in the self-signed certificate (domain A in this example). The electronic message is sent via a mail exchange network.

At step 606, the mail exchange network correlates domain A (the domain in the electronic message sent by the receiver system) to an address that a true owner of domain A has registered with a mail exchange authority. In certain embodiments, the mail exchange network uses a DNS MX record to correlate the domain to an IP address registered to the true owner of domain A. In the example, the DNS MX record correlates domain A to an address of sender system A because sender system A is the true owner of domain A.

At step 608, sender system A (the true owner of the domain) receives the electronic message via the mail exchange network. At step 610, sender system A sends a response indicating that the self-signed certificate of step 602 did not originate from the true owner of the domain. In certain embodiments, sender system A may send a message that explicitly indicates that sender system A did not send the certificate to the receiver system. Alternatively, in certain embodiments, sender system A may implicitly indicate that the self-signed certificate did not originate from sender system A. For example, in step 602, sender system B may have sent the receiver system a public key B as part of the self-signed certificate. The receiver system may have included a secret message encrypted using public key B in the electronic message of step 604. Because sender system A does not have the private key B corresponding to public key B, sender system A cannot correctly decrypt the secret message. If at step 610 sender system A sends a response that is unable to correctly decrypt the secret message, the response implicitly indicates that the self-signed certificate did not originate from the true owner of domain A (sender system A).

At step 612, the mail exchange network communicates the response to the receiver system. At step 614, the receiver system rejects the self-signed certificate from Sender System B and does not authenticate sender system B as the true owner of domain A. Thus, domain A remains available for the true owner (sender system A) to be authenticated. In an alternative embodiment, the receiver system may reject the authentication attempt from sender system B based on a failure to receive any response message from the true owner of the domain. For example, even if the response message of step 610 is not received, the receiver system may reject the authentication attempt from sender system B based on a failure to receive the decrypted secret message within a pre-determined time period.

Although this disclosure has been described in terms of certain embodiments, alterations and permutations of the embodiments will be apparent to those skilled in the art. For example, while the discussion herein often references examples based on email messaging systems, similar protocols and/or systems may be used for provisioning an appliance for encrypting/decrypting VOIP, SMS, IM, and other types of communication systems.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, the steps of any method disclosed herein do not have to be performed in the exact order disclosed, unless explicitly stated. All references to "a/an/the" element, apparatus, component, step, etc. are to be interpreted openly as referring to at least one instance of the element, apparatus, component, step, etc., unless explicitly stated otherwise.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. Accordingly, the above description of the embodiments does not constrain this disclosure. Other changes, substitutions, and alterations are possible without departing from the spirit and scope of this disclosure.

The invention claimed is:

1. A method performed by a receiver system, the method comprising:
receiving a certificate that identifies a sender system as owning a domain;
determining that a signature in the certificate is insufficient to validate the certificate, the determining based on the signature having been signed by a certificate authority with whom the receiver system does not have a trust relationship or the signature having been self-signed by the sender system;
in response to determining that the signature is insufficient to validate the certificate, sending an electronic message to the domain identified in the certificate, the electronic message sent via a mail exchange network, wherein the mail exchange network correlates the domain to an address that a true owner of the domain has registered with a mail exchange authority;
receiving a response from the address that the mail exchange network correlates to the domain, the response indicating that the certificate is associated with the true owner of the domain; and
validating the certificate as trusted and authenticating the sender system as the true owner of the domain based on the response.

2. The method of claim 1, wherein:
the certificate includes a public key;
the electronic message to the domain identified in the certificate contains a secret message encrypted using the public key;
the response from the address that the mail exchange network correlates to the domain contains the secret message as decrypted by the domain; and
authenticating the sender system as the true owner of the domain comprises verifying the decrypted secret message.

3. The method of claim 2, wherein the certificate indicates a time period during which the certificate is valid.

4. The method of claim 2, wherein the secret message as decrypted by the domain is received within a predetermined period of time.

5. The method of claim 2, further comprising provisioning encryption services for the domain as a result of authenticating the sender system as the true owner of the domain.

6. The method of claim 2, further comprising determining that the secret message as decrypted by the domain is not received within a predetermined period of time and, in response, resending the encrypted secret message to the domain identified in the certificate.

7. The method of claim 2, further comprising determining that the secret message as decrypted by the domain is not received within a predetermined period of time and, in response, determining that ownership of the domain is to remain available for authentication.

8. The method of claim 1, further comprising:
after authenticating the sender system as the true owner of the domain, receiving a request to authenticate a different sender system as the true owner of the domain; and
denying the request to authenticate the different sender system as the true owner of the domain based on having already authenticated the original sender system as the true owner of the domain.

9. A receiver system, comprising:
at least one processor and at least one storage device, the at least one processor, in conjunction with the at least one storage device, configured to cause the receiver system to:
receive a certificate that identifies a sender system as owning a domain;
determine that a signature in the certificate is insufficient to validate the certificate, the determination based on the signature having been signed by a certificate authority with whom the receiver system does not have a trust relationship or the signature having been self-signed by the sender system;
in response to determining that the signature is insufficient to validate the certificate, send an electronic message to the domain identified in the certificate, the electronic message sent via a mail exchange network, wherein the mail exchange network correlates the domain to an address that a true owner of the domain has registered with a mail exchange authority; and
determine whether to validate the certificate as trusted and authenticate the sender system as the true owner of the domain based at least in part on whether a response indicating that the certificate is associated with the true owner of the domain has been received from the address that the mail exchange network correlates to the domain.

10. The receiver system of claim 9, wherein:
the certificate includes a public key;
the electronic message to the domain identified in the certificate contains a secret message encrypted using the public key;
the response from the address that the mail exchange network correlates to the domain contains the secret message as decrypted by the domain; and
authenticating the sender system as the true owner of the domain comprises verifying the decrypted secret message.

11. The receiver system of claim 10, wherein the certificate indicates a time period during which the certificate is valid.

12. The receiver system of claim 10, wherein the secret message as decrypted by the domain is received within a predetermined period of time.

13. The receiver system of claim 10, the at least one processor further configured to cause the receiver system to, as a result of authenticating the sender system as the true owner of the domain, provision encryption services for the domain.

14. The receiver system of claim 10, the at least one processor further configured to cause the receiver system to determine that the secret message as decrypted by the domain is not received within a predetermined period of time and, in response, resend the encrypted secret message to the domain identified in the certificate.

15. The receiver system of claim 10, the at least one processor further configured to cause the receiver system to determine that the secret message as decrypted by the domain is not received within a predetermined period of time and, in response, determine that ownership of the domain is to remain available for authentication.

16. The receiver system of claim 9, the at least one processor further configured to cause the receiver system to:
after authenticating the sender system as the true owner of the domain, receive a request to authenticate a different sender system as the true owner of the domain; and
deny the request to authenticate the different sender system as the true owner of the domain based on having already authenticated the original sender system as the true owner of the domain.

17. A non-transitory computer readable medium comprising logic that, when executed by one or more processors, is operable to:
receive a certificate that identifies a sender system as owning a domain;
determine that a signature in the certificate is insufficient to validate the certificate, the determination based on the signature having been signed by a certificate authority with whom the receiver system does not have a trust relationship or the signature having been self-signed by the sender system;
in response to determining that the signature is insufficient to validate the certificate, send an electronic message to the domain identified in the certificate, the electronic message sent via a mail exchange network, wherein the mail exchange network correlates the domain to an address that a true owner of the domain has registered with a mail exchange authority;
receive a response from the address that the mail exchange network correlates to the domain, the response indicating that the certificate is associated with the true owner of the domain; and
validate the certificate as trusted and authenticate the sender system as the true owner of the domain based on the response.

18. The computer readable medium of claim 17, wherein:
the certificate includes a public key;
the electronic message to the domain identified in the certificate contains a secret message encrypted using the public key;
the response from the address that the mail exchange network correlates to the domain contains the secret message as decrypted by the domain; and
authenticating the sender system as the true owner of the domain comprises verifying the decrypted secret message.

19. The computer readable medium of claim 18, wherein the certificate indicates a time period during which the certificate is valid.

20. The computer readable medium of claim 18, wherein the secret message as decrypted by the domain is received within a predetermined period of time.

21. The computer readable medium of claim 18, the logic further operable to, as a result of authenticating the sender system as the true owner of the domain, provision encryption services for the domain.

22. The computer readable medium of claim 18, the logic further operable to determine that the secret message as decrypted by the domain is not received within a predetermined period of time and, in response, resend the encrypted secret message to the domain identified in the certificate.

23. The computer readable medium of claim 18, the logic further operable to determine that the secret message as decrypted by the domain is not received within a predetermined period of time and, in response, determine that ownership of the domain is to remain available for authentication.

24. The computer readable medium of claim 17, the logic further operable to:
after authenticating the sender system as the true owner of the domain, receive a request to authenticate a different sender system as the true owner of the domain; and
deny the request to authenticate the different sender system as the true owner of the domain based on having already authenticated the original sender system as the true owner of the domain.

* * * * *